United States Patent [19]
Shahab et al.

[11] Patent Number: 5,544,933
[45] Date of Patent: Aug. 13, 1996

[54] ENERGY ABSORBING VEHICLE PILLAR STRUCTURE

[75] Inventors: Syed A. Shahab, Bloomfield; Mehran Chirehdast, Ann Arbor, both of Mich.

[73] Assignee: Ford Motor Company, Dearborn, Mich.

[21] Appl. No.: 272,365

[22] Filed: Jul. 8, 1994

[51] Int. Cl.$^6$ ................................. B62D 25/04
[52] U.S. Cl. ..................... 296/189; 296/188; 296/203
[58] Field of Search ................................. 296/188, 189, 296/194, 203, 210; 280/748, 751

[56] References Cited

U.S. PATENT DOCUMENTS

| | | | |
|---|---|---|---|
| 3,779,595 | 12/1973 | Suzuki et al. | 296/189 X |
| 3,904,223 | 9/1975 | Wilfert et al. | 280/751 |
| 5,163,730 | 11/1992 | Welch . | |

FOREIGN PATENT DOCUMENTS

| | | | |
|---|---|---|---|
| 302726 | 2/1989 | European Pat. Off. | 296/188 |
| 60-94874 | 5/1985 | Japan | 296/194 |
| 0022680 | 1/1989 | Japan | 296/194 |
| 3032990 | 2/1991 | Japan | 296/203 |

*Primary Examiner*—Dean Kramer
*Attorney, Agent, or Firm*—Daniel M. Stock

[57] ABSTRACT

An improved structure is provided for supporting pillars of automotive vehicles which provides energy absorption through provision of a pair of energy absorbing chambers (52,50) defined by an interior trim pillar (28) and interior (26) and exterior (24) panels forming the "A" pillar of a vehicle (10), respectively. Energy absorbing media (30), such as springs (76,78,86), elongated tubes (84) and viscous fluids are taught for use as energy absorbers.

4 Claims, 2 Drawing Sheets

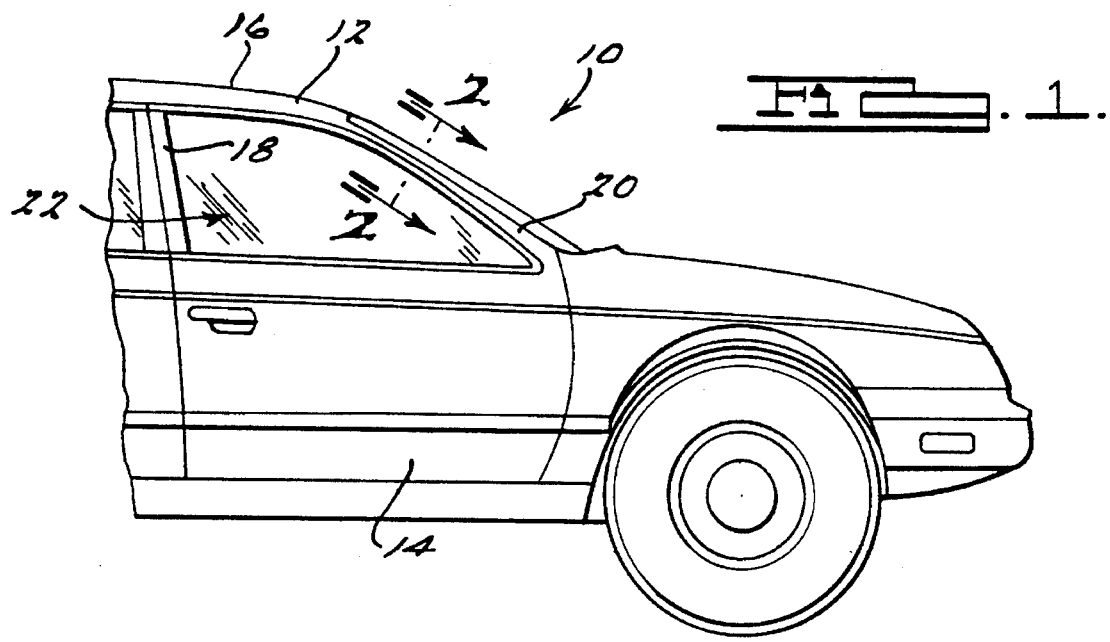
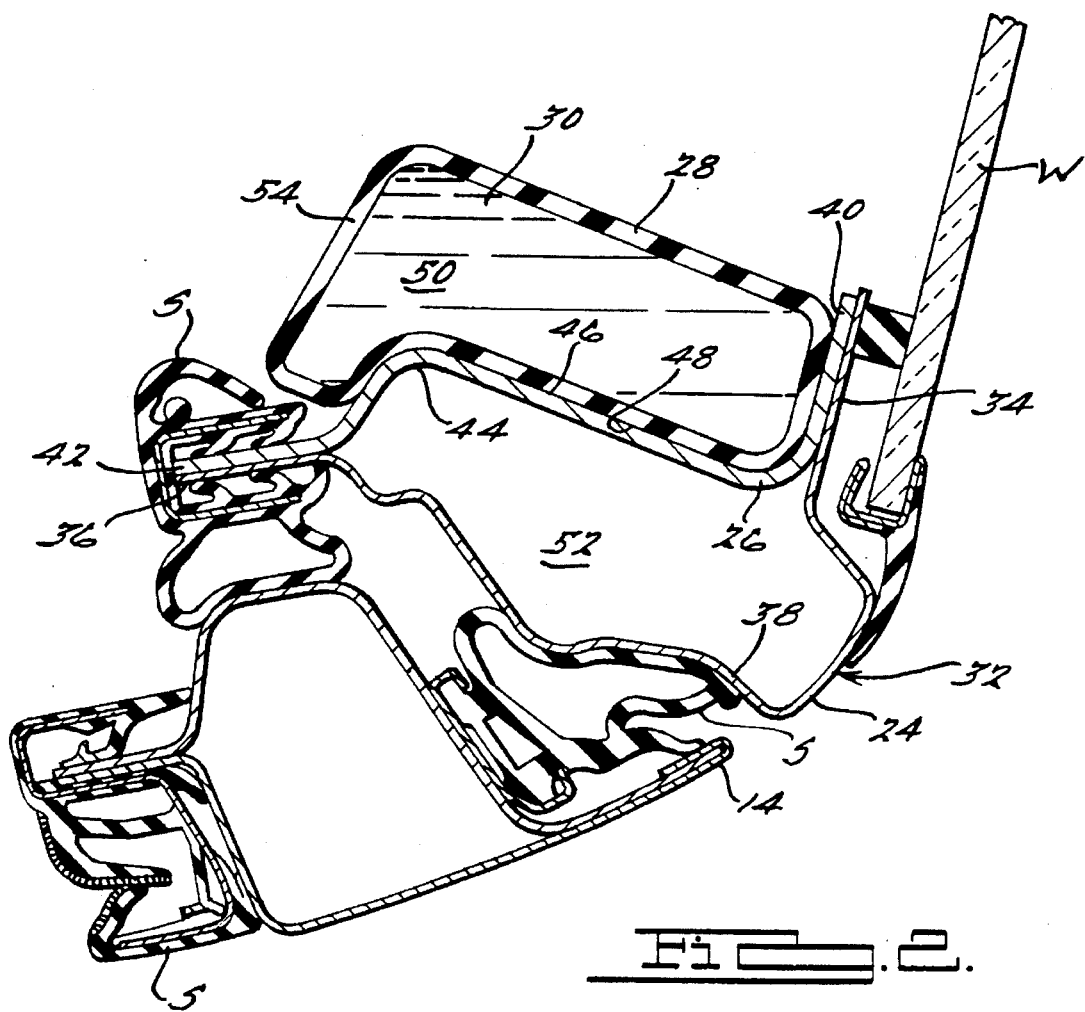

5,544,933

ENERGY ABSORBING VEHICLE PILLAR STRUCTURE

BACKGROUND OF THE INVENTION

1. Technical Field

The present invention relates generally to automotive vehicle body structure, and more particularly to the construction of automotive vehicle pillars to accommodate energy absorption.

2. Description of the Prior Art

In the design of modern automotive vehicles, it is has been a goal to provide body structures which manage the absorption of energy in response to the imposition of frontal loads. More recent design activity in the vehicle body arts has been directed to the management of energy imposed on the vehicle occupant compartment in response to loads imposed on the sides of the vehicle and to loading imposed within the vehicle occupant compartment. While the cushioning of surfaces facing the vehicle occupant compartment has long been practiced in the automotive industry, the basic, usually metal, structure of the body itself has been accommodated rather than made an integral part of the energy management design, although early designs, such as that exemplified in U.S. Pat. No. 5,163,730 to Welch, indicate the general principle of cushioning such structure is known. This cushioning, however, is disadvantageously limited to localized positions on the pillar, which may not provide optimal energy management in all applications.

More recently commonly assigned U.S. Ser. No. 08/225,689 disclosed a more comprehensive cushioning approach in certain pillar embodiments in which cushioning media are carried within the pillar. Accommodating such structure within a pillar is not, in all cases, possible or desirable.

SUMMARY OF THE INVENTION

It is an object of the present invention to overcome the disadvantages of the prior art and define an energy absorbing pillar structure which enhances the capability of the pillar to absorb energy in response to loads laterally imposed with respect to the vehicle.

This is accomplished through providing such a structure that includes an exterior panel, an interior panel, and an interior trim pillar secured to the interior panel configured to define a first energy absorbing chamber between the panels, the trim pillar including energy absorbing media carried within a second energy absorbing chamber therein defined.

BRIEF DESCRIPTION OF THE DRAWINGS

The efficacy of the invention pillar structure and its advantages over the prior art will become apparent to those skilled in the automotive body arts upon reading the following description with reference to the accompanying drawings, in which like numbers preceded by the figure number refer to like parts throughout the several views and in which:

FIG. 1 is a partial side view of an automotive vehicle;

FIG. 2 is a cross section taken along line 2—2 of FIG. 1;

DESCRIPTION OF THE PREFERRED EMBODIMENTS

Figure 3:
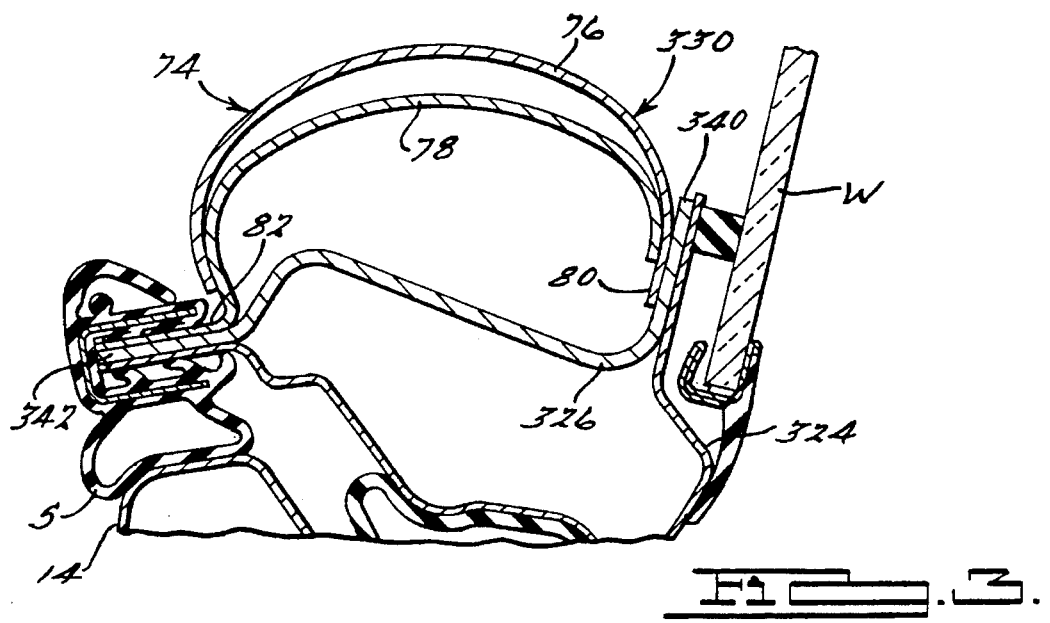
FIG. 3 is a cross-sectional view similar to FIG. 2 illustrating an alternative embodiment.

Turning now to the drawings, in particular to FIG. 1 thereof, an automobile 10 is illustrated as having a body 12 having a lower portion such as indicated at the door 14, a roof portion 16, and pillars 18, 20. As is conventional, the pillars 18, 20 provide support for the roof 16 in closing the vehicle occupant compartment indicated generally at 22.

According to the present invention, the pillars 18, 20 are constructed to enhance energy absorption in response to loads imposed laterally of the pillars. As used herein, it is to be understood that the pillars 18, 20 extend generally vertically between the lower portion 14 of the vehicle 10 and the roof 16, and that loads imposed generally normal to this vertical extent are referred to as lateral or side loads.

The pillars 18, 20 are preferably fabricated as metal stampings. According to the present invention, they are configured to enhance energy absorption both by the shape and arrangement of the metal stampings and by cooperation with interior trim structure to define an overall energy absorbing pillar structure.

Turning now to FIG. 2, one preferred embodiment for the front or A-pillar 20 is illustrated as including an exterior panel 24, an interior panel 26, an interior trim pillar 28, and energy absorbing media 30 disposed within the trim pillar 28.

The exterior panel 24, which is illustrated in FIG. 2, defines an outwardly concave external surface 32. First and second peripheral flange portions 34, 36 bound an outwardly concave section 38 to define a truss-like structure adjacent the door 14. Known seal assemblies, generally denoted by the letter S are conventionally carried for sealing engagement between the panel 24 and the door 14; and the vehicle windshield W is mounted against the flange 34.

The interior panel 26 likewise includes first and second peripheral flanges portions 40, 42 positioned in facing relationship with respect to the flange portions 34, 36 of the exterior panel 24. A concave inward truss portion 44 having a profiled laterally inwardly facing surface 46 extends between the flange portions 40, 42.

The interior trim pillar 28 is carried interiorly of the interior panel 26 in complementary relationship with the surface 46 thereof. As shown in FIG. 2 the trim pillar 28 is of L-shaped cross section and includes external surfaces 48 abutting the facing surfaces 46 of the interior panel 26. The trim pillar 28 is illustrated as being fabricated from a relatively soft plastic or rubber material and is formed in a closed section to define an energy absorbing chamber 50 for containing the energy absorbing media 30. To cooperate in the response of the pillar 20 to the imposition of lateral loads it is necessary to fixedly secure the trim pillar 28 in the position shown. This may be accomplished by conventional fastening means such as acrylic foam tape, urethane adhesive, rivets, clips and other mechanical fasteners, illustration of which is not needed for those skilled in the automotive body arts.

With the panels 24, 26, and the trim pillar 28 so arranged, a first energy absorbing chamber 52 is defined between the exterior panel 24 and the interior panel 28, and a second energy absorbing chamber 50 is defined within the interior trim pillar 28.

According to this preferred embodiment, the energy absorbing medium 30 is preferably a viscous fluid, such as an oil or grease. Design thickness and configuration of the surrounding walls 54 defining the chamber 50 may established to either contain or release fluid in response to loading.

Turning next to FIG. 3, the configuration in this embodiment for the pillar 20 is essentially identical to that in FIG. 2 save the provision of an alternative energy absorbing medium 330, preferably defined as a generally C-shaped, outward opening, resilient spring assembly 74. Two springs 76, 78 are interleaved to be grounded against the inner panel 326. The spring 76 has an out-turned flange 80 that is secured to the flange 340 of interior panel 326, and the spring 78 has an out-turned flange 82 secured to the flange 342 of the interior panel 326.

Figure 4:
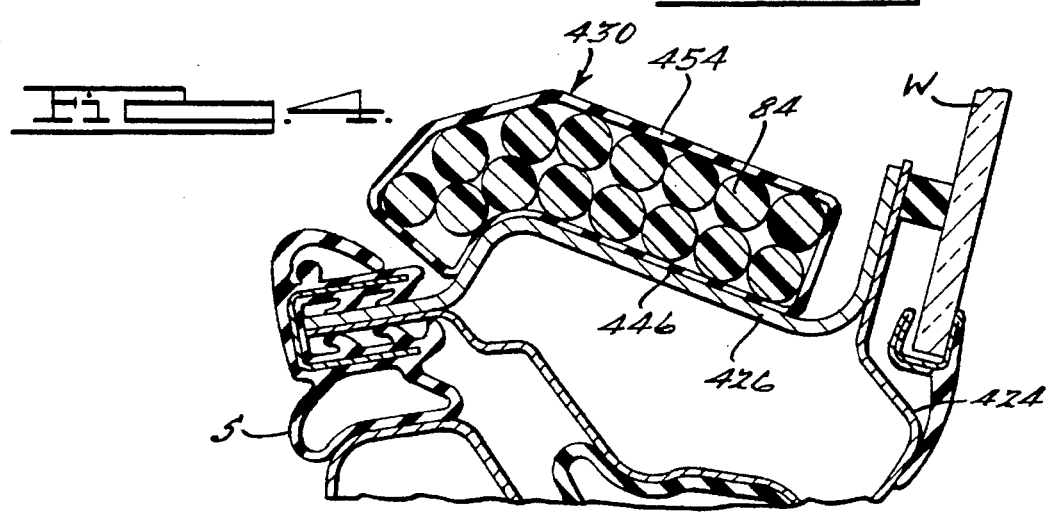
FIG. 4 is a cross-sectional view similar to FIG. 3 illustrating another alternative embodiment.

Turning next to FIG. 4, the configuration in this embodiment for the pillar 20 is essentially identical to that in FIG. 2 save the provision of an alternative energy absorbing medium 430, preferably defined as a plurality of crushable tubes 84 extending generally parallel to the longitudinal axis of the pillar 20. It is contemplated that aluminum or rubber may be used in constructing the tubes, energy absorbing requirements of a particular vehicle application dictating the choice. In some applications it may be possible to eliminate the walls 454 of the trim pillar 430 and gang the tubes 84 together in complementary conformance with the surface 446 of the interior panel 426 in fixed relationship, as through the use of adhesives.

Figure 5:
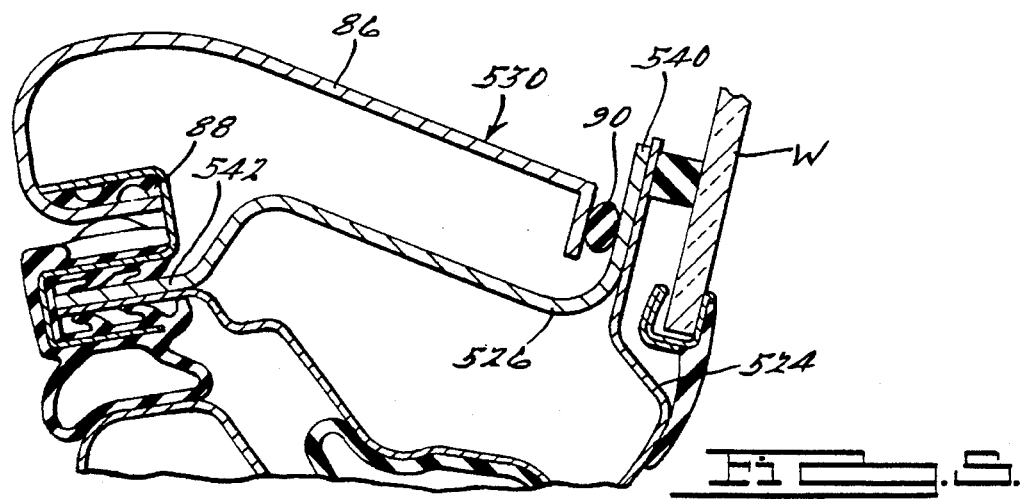
FIG. 5 is a cross-sectional view similar to FIG. 3 illustrating yet another alternative embodiment.

Turning lastly to FIG. 5, yet another energy absorbing medium is indicated at 530, differing from the medium 430 illustrated in FIG. 4 in that a spring member 86, preferably of metallic construction, is received in snap-in relationship at one end in a clip assembly 88 or other device adjacent the flange 542 of interior panel 526 and is adhesively secured at its other end, as indicated at 90, to the flange 540. This embodiment offers the capability of tailoring energy management response to loading in a variable fashion. Depending upon the direction in which loading is imposed (left or right as viewed in FIG. 5) the attachment of the spring 86 to the interior panel 526 will fail at 88 or 90 without failure at the other, changing the resistance of the overall trim pillar 524 to deformation.

In each of the embodiments shown, the energy absorbing capability of the structural pillars of the automotive vehicle 10 is improved over the prior art through the provision of an interior trim pillar that carries an energy absorbing medium and is fixedly secured to the body structure in a complementary fashion. This improved structure may, in some situations permit economies in the design of the structural pillars because of the added function provided by the improved trim pillars.

While only certain embodiments of the pillar structure of the present invention have been shown and described, others may be occur to those skilled in the automotive vehicle body arts which do not depart from the scope of the appended claims.

We claim:

1. An energy absorbing pillar structure for an automotive vehicle, comprising:

an exterior panel arranged in generally vertical orientation to define an outwardly concave exterior surface of the vehicle;

an interior panel arranged in longitudinal registration with the exterior panel and defining an interior surface convex with respect to the exterior panel exterior surface and defining an energy absorbing chamber with the exterior panel;

an interior trim pillar formed in closed section of a flexible material and fixedly secured to in complementary relationship with substantially all of interior panel interior surface and defining another energy absorbing chamber therein; and energy absorbing media carried laterally within the other chamber and including a plurality of tubes carried within the other chamber and extending generally parallel to the vertical axis of the pillar.

2. An energy absorbing pillar structure as defined in claim 1 wherein the tubes are fabricated from aluminum.

3. An energy absorbing pillar structure as defined in claim 1 wherein the tubes are fabricated from rubber.

4. An energy absorbing pillar structure for an automotive vehicle, comprising:

an exterior panel arranged in generally vertical orientation to define an outwardly concave exterior surface of the vehicle;

an interior panel arranged in longitudinal registration with the exterior panel and defining an interior surface convex with respect to the exterior panel exterior surface and defining an energy absorbing chamber with the exterior panel;

an interior trim pillar fixedly secured to in complementary relationship with substantially all of interior panel interior surface and defining another energy absorbing chamber therein;

means defining peripheral flange portions for joining the exterior and interior panels together; and energy absorbing media carried laterally within the other energy absorbing chamber and comprising a generally C-shaped resilient metal spring assembly opening toward the inner surface of the inner panel to define therewith the other energy absorbing chamber and being mechanically fixedly secured to the peripheral flange portions at one side thereof and being adhesively secured to the flange portions at another side thereof longitudinally displaced from the one side.

* * * * *